United States Patent [19]

Langley et al.

[11] Patent Number: 5,078,342
[45] Date of Patent: Jan. 7, 1992

[54] FAILURE TOLERANT ENGINE MOUNTING

[75] Inventors: Kenneth R. Langley, Wotton-under-Edge; John M. Treby, Bristol; Derek H. C. Fox, Bristol; Malcolm Short, Bristol, all of England

[73] Assignee: Rolls-Royce, plc, London, England

[21] Appl. No.: 617,595

[22] Filed: Nov. 26, 1990

[30] Foreign Application Priority Data

Dec. 5, 1989 [GB] United Kingdom ............ 8927464.1
Jan. 12, 1990 [GB] United Kingdom ............ 9000742.8

[51] Int. Cl.⁵ .................................... B64D 27/16
[52] U.S. Cl. ...................... 244/54; 60/39.31; 248/554
[58] Field of Search ............ 244/53 R, 54, 55; 248/554, 555, 556; 60/39.31

[56] References Cited

U.S. PATENT DOCUMENTS

| | | | |
|---|---|---|---|
| 3,907,220 | 9/1975 | Amelio | 244/54 |
| 4,044,973 | 8/1977 | Moorehead | 244/54 |
| 4,065,077 | 12/1977 | Brooks | 244/54 |
| 4,560,122 | 12/1985 | Parkinson et al. | 244/54 |
| 4,997,145 | 3/1991 | Hodgkinson | 244/54 |

FOREIGN PATENT DOCUMENTS

| | | |
|---|---|---|
| 0249553 | 12/1987 | European Pat. Off. . |
| 2264241 | 3/1975 | France . |
| 1236917 | 6/1971 | United Kingdom . |
| 2045357 | 10/1980 | United Kingdom . |
| 85/02596 | 6/1985 | World Int. Prop. O. . |

Primary Examiner—Joseph F. Peters, Jr.
Assistant Examiner—Carla Mattix
Attorney, Agent, or Firm—Oliff & Berridge

[57] ABSTRACT

A failure tolerant engine mounting is formed by three links between the engine and its support structure, one of the links being arranged so that in the event of failure of either of the other links it will form a connection between three points on the engine and supporting structure which are symmetrically arranged about a vertical axis through the engines center of gravity.

4 Claims, 4 Drawing Sheets

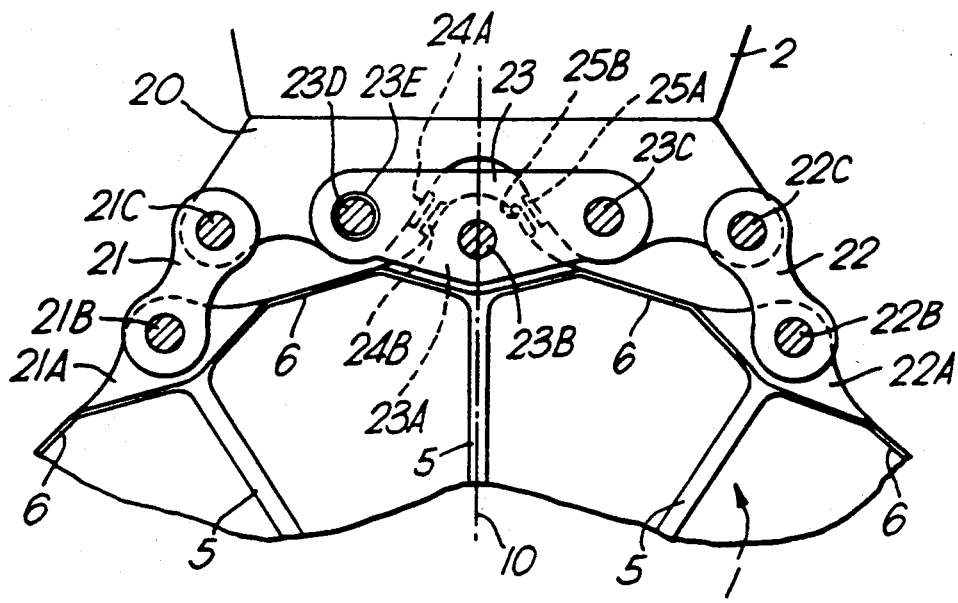
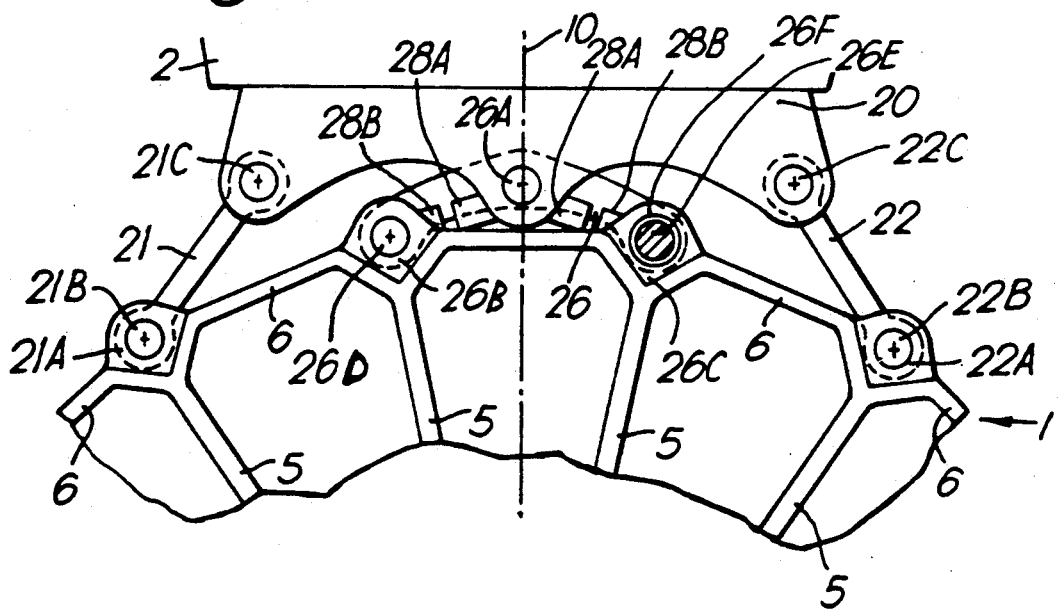

FAILURE TOLERANT ENGINE MOUNTING

FIELD OF THE INVENTION

This invention relates to a failure tolerant engine mounting, and particularly to a mounting for securing an aircraft gas turbine engine to an aircraft structure.

DESCRIPTION OF THE PRIOR ART

It has been found useful to mount aircraft gas turbine engines as shown schematically in FIG. 1. A gas turbine engine 1 is suspended from an aircraft structural member 2.

At this position axially along the engine 1 it is formed internally as a load carrying structure. This load carrying structure comprises an inner annulus 3 linked to an outer ring 4 by a plurality of spokes 5. The engine shaft or shafts rotate inside the inner annulus 3. The outer ring 4 is polygonal and is made up of a plurality of straight faces 6 each of which connect the outer ends of two adjacent spokes 5.

This forms a rigid framework which the non-rotating parts of the engine 1 can be directly supported by and which can support bearings to hold the rotating parts of the engine 1.

In order to hold the engine 1 to the aircraft this rigid framework is attached to the aircraft structural member 2 by three links 7, 8 and 9. Each of which is secured to the engine 1 at a point where a spoke 5 and two straight faces 6 meet. Links 7 and 8 support the vertical load produced by the weight of the engine 1, which acts along the vertical plane 10 which is parallel to the axis of the engine 1 and passes through the centre of gravity 11 of the engine 1, while link 9 supports torque acting on the engine 1 relative to the aircraft. Clearly if one of the links 7, 8 or 9 fails the remaining two links will be unable to hold the engine 1 steady relative to the aircraft structural member 2.

A failure tolerant engine mounting based upon the structure of FIG. 1 is shown in detail in FIG. 2. Each of the links 7, 8 and 9 is secured to the engine 1 at a flange 7A, 8A and 9A, formed at the joint between a spoke 5 and two straight faces 6, by a pin, 7B, 8B and 9B respectively which passes through matching holes in the flanges 7A, 8A and 9A and the links 7, 8 and 9. The links 7, 8 and 9 are also secured to the aircraft structural member 2 by pins 7C, 8C and 9C respectively which pass through matching holes in a flange 12 and the links 7, 8 and 9. The flange 12 is in turn secured to the aircraft structural member 2.

A fail safe connection between the aircraft and engine 1 is formed by a pin 13B passing through a matching hole in the flange 12 and an oversized hole 13C in a flange 13A formed on the straight face 6A between the flanges 7A and 9A.

Normally the pin 13B is not in contact with the side of the oversized hole 13C and does not carry any load.

If the link 7 or its associated pins 7B and 7C fail the engine 1 will drop until the pin 13B contacts the edge of the oversized hole 13C and the weight of the engine 1 will then be supported by the link 8 and pin 13B while torque will continue to be supported by the link 9.

Similarly if link 8 or pins 8B and 8C fail the weight of the engine 1 will be supported by link 7 and pin 13B. If the link 9 or its associated pins 9B and 9C fails the engine 1 will rotate until the pin 13B contacts the edge of the hole 13C and the torque will then be supported by the pin 13B while its weight will continue to be supported by the links 7 and 8.

One problem with this system is that if the link 8 or pins 8B and 8C fail the weight of the engine 1 will be supported by the link 7 and the pin 13B, both on the same side of the vertical plane 10. As a result a large couple will be generated by the weight of the engine 1 and the straight face 6A will have to be thickened to bear this couple without bending. This thickening will increase the weight of the mounting, which is obviously undesirable in an aircraft, and non uniform temperature distribution within the straight face 6A due to its increased thickness can cause thermal fatigue resulting in cracking, lowering engine life.

BRIEF SUMMARY OF THE INVENTION

This invention was intended to produce a failure tolerant engine mounting at least partially overcoming these problems.

This invention provides a failure tolerant engine mounting for attaching an engine to a support structure, comprising first and second links each arranged to connect a point on the engine with a point on the supporting structure and a third link arranged to connect a first point on the engine with a second point on the supporting structure and also incorporating a connection to a third point arranged so that this connection to the third point does not support any load unless one of the other connections fails, and so that in the event of the first or second connections failing the three points connected by the third link will lie one on each side of and one upon, a vertical plane parallel to the engine axis and passing through the centre of gravity of the engine.

BRIEF DESCRIPTION OF SEVERAL VIEWS OF THE DRAWING

An engine mounting embodying the invention will now be described by way of example only with reference to the accompanying figures in which;

FIG. 3 shows a first engine mounting employing the invention, FIG. 4 shows a second engine mounting employing the invention.

DETAILED DESCRIPTION

Figure 1:
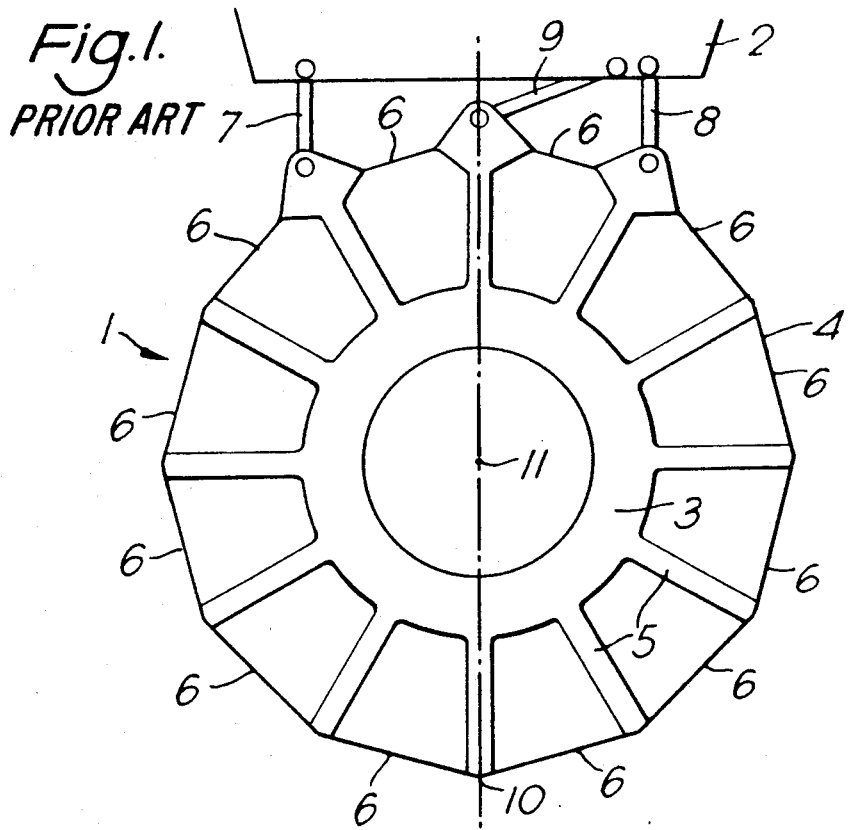
FIG. 1 shows a general view of a known engine and its mounting to a support structure.
Figure 2:
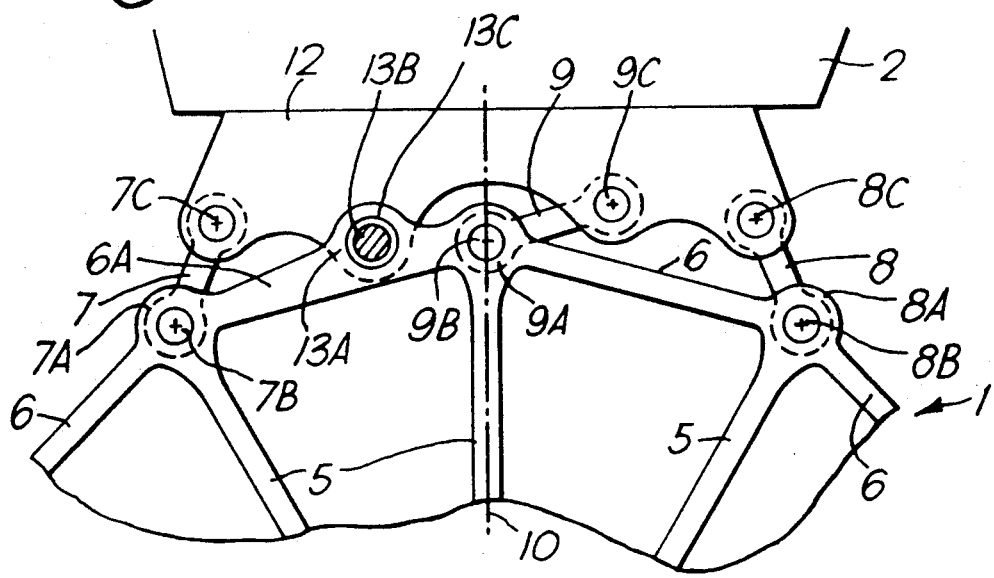
FIG. 2 shows a more detailed view of a known engine mounting suitable for use in the arrangement of FIG. 1.

Referring to FIG. 3 an aircraft gas turbine engine 1 includes a rigid framework comprising a plurality of spokes 5 and straight faces 6. The engine 1 is linked to a flange 20 attached to an aircraft structural member 2 by three link members 21, 22 and 23.

Three flanges 21A, 22A and 23A are formed at the junctions of spokes 5 and straight faces 6. The link member 21 is connected to the flange 21A by a pin 21B which passes through matching sized holes in the flange 21A and the link member 21 and to the flange 20 by a pin 21C which passes through matching sized holes in the link member 21 and flange 20.

Similarly the link member 22 is connected to the flanges 22A and 20 by pins 22B and 22C respectively which pass through matching sized holes in the link member 21 and flanges 21A and 20 respectively.

The links formed by link members 21 and 22 and their associated pins 21A, 22A, 21B and 22B support the weight of the engine 1.

The link member 23 is connected to the flange 23A by a pin 23B which passes through matching sized holes in the flange 23A and link member 23, it is also connected to the flange 20 by a pin 23C which passes through matching fixed holes in the flange 20 and link member 23. The link member 23 also forms a fail safe connection by a pin 23D which passes through a matching sized hole in the flange 20 and an oversized hole 23E in the link member 23. The pins 23C and 23D are equally spaced on either side of the vertical plane 10. Two pairs of torque stops 24A, 24B and 25A, 25B are attached to opposing faces of the flanges 20 and 23A. The torque stops 24A and 25A are attached to the flange 20 while the torque stops 24B and 25B are attached to the flange 23A.

The link formed by the link member 23 and its associated pins 23B and 23C supports the torque on the engine 1.

If one of the link members 21 and 22 or their associated pins 21B, 21C, 22B and 22C fails the engine 1 will drop until the pin 23D contacts the edge of the oversized hole 23E, the weight of the engine 1 will then be supported by the remaining one of links formed by link members 21 and 22 and the link member 23 by way of the three pins 23B, 23C and 23D, while the link member 23 will continue to support the torque on the engine 1. Since the link member 23 and its attachments to the flanges 20 and 23A by pins 23B, 23C and 23D are symmetrical about the vertical plane 10 which passes through the centre of gravity of the engine 1 no unwanted couple is generated by the weight of the engine 1.

If the pin 23C or the link member 23 between pins 23B and 23C fails the engine 1 will rotate until the pin 23D contacts the edge of the oversized hole 23E whereupon the pins 23B and 23D and the link member 23 between them will support the torque. Alternatively if the pin 23B fails the engine 1 will rotate until one of the two pairs of torque stops 24A, 24B, 25A and 25B are brought into contact, whereupon the torque will be supported by one of the pairs of torque stops 24a, 24B, 25A, and 25B depending on the direction of the torque.

In either case the links formed by link members 21 and 22 will support the weight of the engine.

Another type of mounting is shown in FIG. 4, this is similar to the mounting shown in FIG. 3 having link members 21 and 22 attached by pins 21B and 22B to flanges 21A and 22A respectively and to a flange 20 by pins 21C and 22C respectively, the links formed by link members 21 and 22 supporting the weight of the engine 1.

The link member 23 in FIG. 3 is replaced by a link member 26. The link member 26 is attached to the flange 20 by a pin 26A passing through matching sized holes in the flange 20 and the link member 26.

Two flanges 26B and 26C are formed at the junctions of the straight faces 6 with two spokes 5 equally spaced on either side of the vertical plane 10. The link member 26 is secured to the flange 26B by a pin 26D passing through matching sized holes in the flange 26B and the link member 26. A pin 26E passes through a matching sized hole in the link member 26 and an oversized hole 26F in the flange 26C.

Two pairs of torque stops 27A, 27B, 28A and 28B are arranged on opposing faces of the flanges 20, 26B and 26C respectively The torque stop 27A and 28A being arranged on the flange 20, the torque stop 27B being arranged on the flange 26B and the torque stop 28B being arranged on the flange 26C.

The link formed by link member 26 supports the torque on the engine 1.

If one of the links formed by the link members 21 and 22 or their associated pins 21B, 21C, 22B and 22C fails the engine 1 will drop until the pin 26E contacts the edge of the oversized hole 26F, the weight of the engine 1 will then be supported by the remaining one of links formed by the link members 21 and 22 and the link member 26 by way of the three pins 26A, 26D and 26E, while the link member 26 will continue to support the torque on the engine 1. Since the link member 26 and its attachments to the flanges 20, 26B and 26C by pins 26A, 26D and 26E respectively are symmetrical about the vertical plane 10 which passes through the centre of gravity of the engine 1 no unwanted couple is generated by the weight of the engine 1.

If the pin 26D or the link member 26 between pins 26A and 26D fails the engine 1 will rotate until the pair 26E contacts the edge of the oversized hole 26F whereupon the pins 26A and 26F and the link member 26 between them will support the torque. Alternatively if the pin 26A fails the engine 1 will rotate until one of the two pairs of torque stops 27A, 27B, 28A and 28B are brought into contact whereupon the torque will be supported by one of the two pairs of torque stops 27A, 27B, 28A and 28B depending on the direction of the torque.

In both cases the weight of the engine 1 will be supported by the links formed by the link members 21, 22.

Generally the mounting shown in FIG. 3 will be preferred when one of the spokes 5 lies in the vertical plane 10 while the mounting shown in FIG. 4 will be preferred when none of the spokes 5 lie in the vertical plane 10. This is because such a choice of mountings allows the flanges 23A, 26B and 26C to be formed at the ends of the spokes 5 and so transmit loads directly between the links 21, 22, 23 and 26 and the intersections between the spokes 5 and the straight faces 6.

However other arrangements are possible and may be advantageous in some circumstances.

Figure 5:
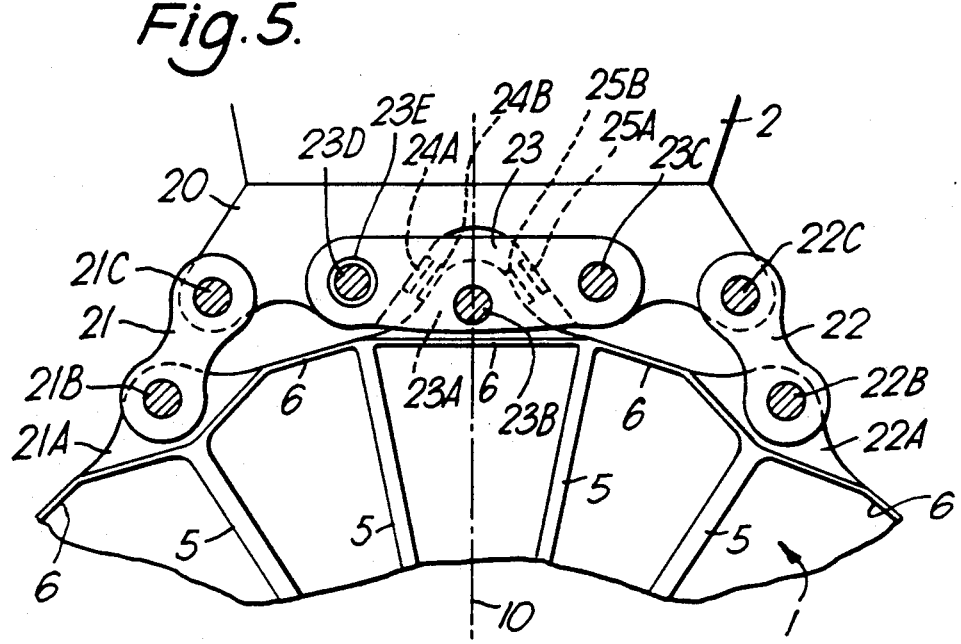
FIG. 5 shows a third engine mounting employing the invention.

FIG. 5 shows an engine mounting substantially similar to that shown in FIG. 3, the difference being that the spokes 5 are arranged such that none of them lie in the vertical plane 10 and the flange 23A is formed on one of the flat faces 6 of the framework between two spokes 5.

Figure 6:
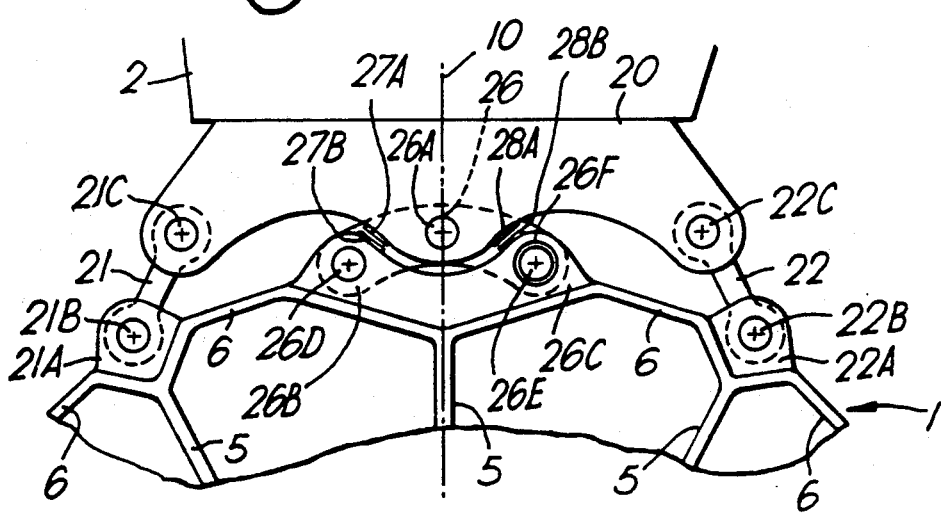
FIG. 6 shows a fourth engine mounting employing the invention, and, FIG. 7 shows a fifth engine mounting employing the invention, identical parts having the same reference numerals throughout.

FIG. 6 shows an engine mounting substantially similar to that shown in FIG. 4, the difference being that the spokes 5 are arranged such that one of them lies in the vertical plane 10 and the flanges 26B and 26C are formed on the flat faces 6 of the framework on either side of the spoke 5 lying in the vertical plane 10.

If, in any of the arrangements described above, a thrust mounting seperate from the weight and torque mounting shown is used to fix the engine axially relative to the aircraft, the engine and aircraft structure may move axially relative to one another at the weight and torque mounting due to differential thermal expansion of the engine and aircraft structure.

Looking at FIG. 3, relative axial movement of the flanges 20 and 23A will cause the link 23 to pivot relative to the pins 23B and 23C. This pivoting will cause the end of the link 23 adjacent to the pin 23D to move relative to the flange 20 by double the relative movement of the flanges 20 and 23A.

This large amount of relative movement of link 23 and the flange 20 is undesirable because it requires that the pin 23D be long to allow for the movement of the link 23 and also requires that a space be left clear adjacent the engine 1 for the link 23 to move through.

Figure 7:
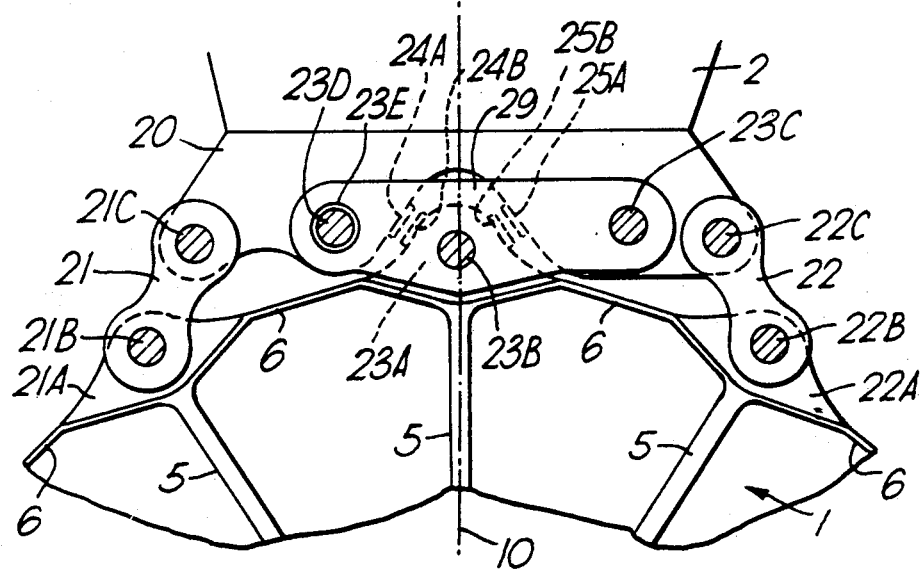

Referring to FIG. 7 an improved version of the mounting shown in FIG. 3 is shown, modified to reduce this problem.

This improved mounting is substantially the same as the mounting shown in FIG. 3 except that the pin 23C is moved further away from the plane 10 and the link 23 is replaced by an assymetric link 29.

If relative axial movement of the flanges 20 and 23A occurs the link 29 will pivot about the pins 23B and 23C and this pivoting will cause the end of the link 29 adjacent to the pin 23D to move relative to the flange 20. However because the distance between the pins 23B and 23D is less than the distance between the pins 23B and 23C this movement will be less than in the arrangement of FIG. 3.

Similarly an asymmetric link could be substituted for the link member 23 in the mounting shown in FIG. 5 or for the link members 26 in the mountings shown in FIGS. 4 and 6. In the mounting shown in FIG. 5 the pin 23C would be placed further than the pin 23D from the plane 10.

In the mountings shown in FIGS. 3 and 5 the pin 26D would be placed further than the pin 26E from the plane 10.

A flange 20 is attached to the aircraft structural member 2 to support the engine 1 because the complex shapes of the flange 20 will generally be inconvenient for a structural member, however the link members 21, 22, 23 and 26 could be attached directly to the structural member 2 if desired.

The flanges 21A, 22A, 23A, 26D and 26E may be attached to the straight faces 6 and spokes 5 o be of unitary construction with them.

The use of pins to attach the link members to flanges is convenient but any other method of securing could be employed.

We claim:

1. A failure tolerant engine mounting for attaching an engine to a support structure, comprising first and second links each arranged to connect a point on the engine with a point on the support structure forming first and second connections and a third link arranged to connect a first point on the engine with a second point on the supporting structure and also incorporating a third connection to a third point arranged so that this third connection to the third point does not support any load unless one of the other connections fails, and so that in the event of the first or second connections failing the three points connected by the third link will lie one on each side of and one upon, a vertical plane parallel to the engine axis and passing through the center of gravity of the engine.

2. A mounting as claimed in claim 1 in which the three points connected by the third link are symmetrical about the vertical plane.

3. A mounting as claimed in claim 1 in which the third point is on the engine.

4. A mounting as claimed in claim 1 in which the third point is on the supporting structure.

* * * * *